UNITED STATES PATENT OFFICE.

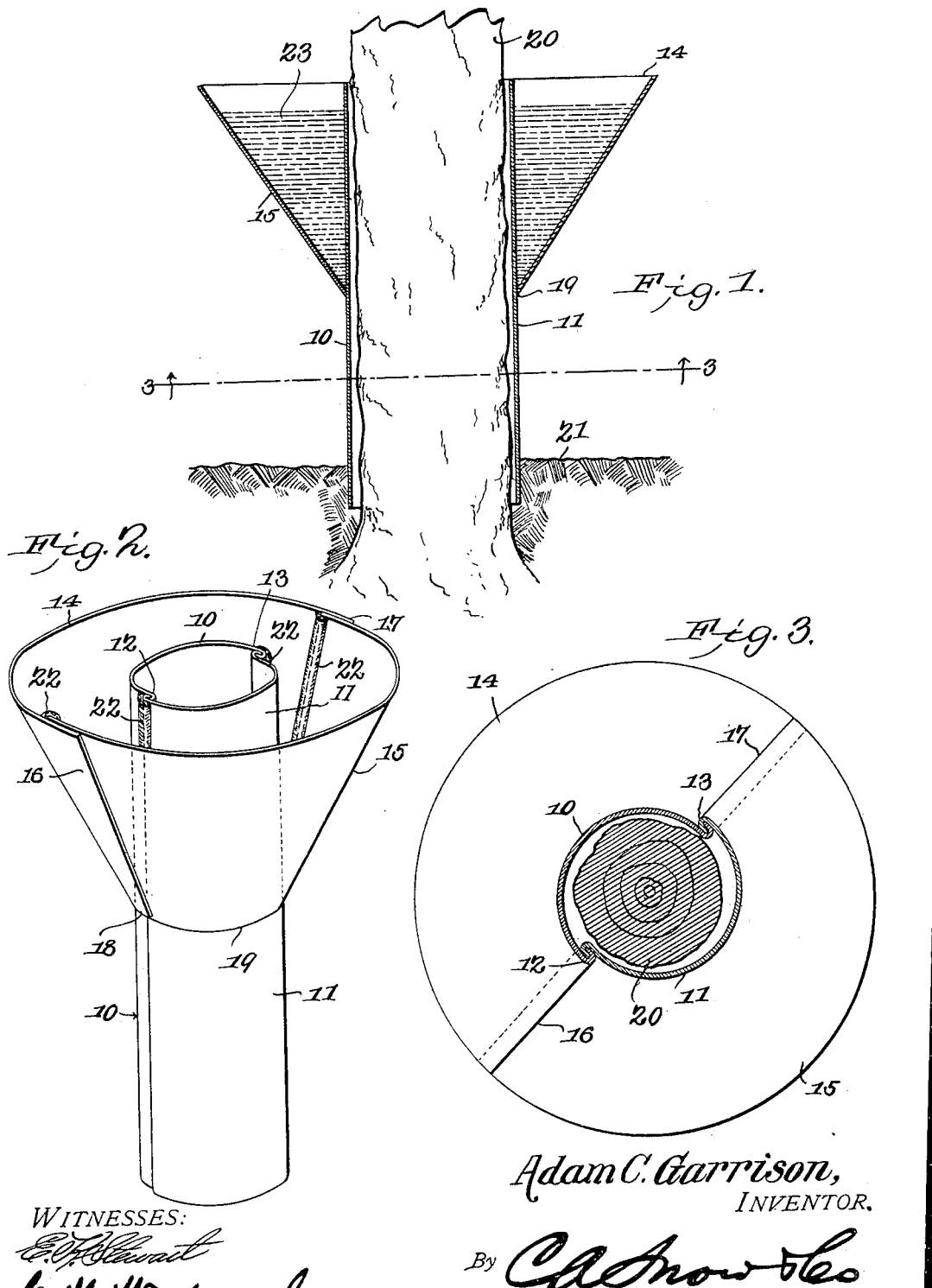

ADAM C. GARRISON, OF JOPLIN, MISSOURI.

TREE-PROTECTOR.

No. 818,678.

Specification of Letters Patent.

Patented April 24, 1906.

Application filed January 11, 1906. Serial No. 295,632.

*To all whom it may concern:*

Be it known that I, ADAM C. GARRISON, a citizen of the United States, residing at Joplin, in the county of Jasper and State of Missouri, have invented a new and useful Tree-Protector, of which the following is a specification.

This invention relates to devices for protecting trees from injurious insects, and has for its object to improve the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

Figure 1 is a sectional elevation of the improved device applied. Fig. 2 is a perspective view of the improved device detached. Fig. 3 is a bottom plan view.

The improved device comprises a tubular portion formed in two semitubular sections 10 11, divided longitudinally, with the meeting edges interfolded, as shown at 12 13, the tubular portion adapted to be disposed around the tree-trunk (indicated at 20) by moving the two semitubular sections into position endwise after being placed upon opposite sides of the tree. The semitubular section 10 is provided with a semiconical plate 14, with its larger end upward and fastened by its lower smaller end, as at 18, to the section 10 in any suitable manner, preferably by soldering. The semicircular section 11 is provided with a semiconical member 15, with its larger end upward and its lower smaller end secured, as at 19, to the section 10 in any suitable manner, preferably by soldering. The adjacent edges of the conical sections overlap, as at 16 17.

The semitubular section 10, with its semiconical member 14 united thereto, and the semitubular section 11, with its semiconical member 15 attached thereto, are placed upon opposite sides of the tree-trunk one above the other, and then the members 10 11 unite by sliding the interlapping folds 12 13 within each other, the overlapping portions 16 17 of the conical members being at the same time engaged, as shown in Fig. 2. The lower ends of the united semitubular sections are then embedded in the earth at the roots of the tree, as represented at 21. The overlapped joints 16 17 and the interfolded joints 12 13 are then covered with some suitable material or compound impervious to water or other liquids, which will adapt the funnel-shaped interior of the united members 14 15 to hold water or other liquid. The compound or material employed may be of any suitable quality, such as coal-tar, which answers the purpose under all ordinary conditions and is indicated at 22.

The tubular portion extending into the ground and above the same for a greater or lesser distance effectually protects the tree-trunk from insects or animals, which might injure them. If the insects crawl up the tubular portion, they are met by the outwardly-flaring conical portion and many species turned back thereby, while others will be turned back by the abrupt upper edge of the conical portion, which they will not cross. Any insects which would not be turned back by the upper edge of the conical portion will be certainly turned back or destroyed by the liquid therein, which is indicated at 23. Any insects that seek to pass from the trunk of the tree to the earth are trapped in the same manner within the conical portion.

The device is simple in construction, can be inexpensively manufactured, and readily adapted to any size of tree and like object.

Having thus described the invention, what is claimed is—

1. A tree-protector comprising two semitubular sections having interfolding edges, each of said sections having a semiconical member connected thereto with the edges of said members overlapping when the semitubular sections are united.

2. A tree-protector comprising two semitubular sections having interfolding edges, each of said sections having a semiconical member connected thereto with the edges of said members overlapping when the semitubular sections are united, and a plastic element applied to overlapping portions of the semiconical members and also to the interlapping joints of the semitubular sections.

In testimony that I claim the foregoing as my own I have hereto affixed my signature in the presence of two witnesses.

ADAM C. GARRISON.

Witnesses:
KATE D. CLOVER,
C. CLOVER.